(12) United States Patent
Ishii

(10) Patent No.: US 9,203,518 B2
(45) Date of Patent: Dec. 1, 2015

(54) OPTICAL TRANSMITTER AND WAVEFORM COMPENSATION METHOD

(75) Inventor: Toshio Ishii, Yokohama (JP)

(73) Assignee: FUJITSU OPTICAL COMPONENTS LIMITED, Kawasaki (JP)

(*) Notice: Subject to any disclaimer, the term of this patent is extended or adjusted under 35 U.S.C. 154(b) by 115 days.

(21) Appl. No.: 13/561,552

(22) Filed: Jul. 30, 2012

(65) Prior Publication Data

US 2013/0084065 A1 Apr. 4, 2013

(30) Foreign Application Priority Data

Sep. 29, 2011 (JP) ................. 2011-215553

(51) Int. Cl.
*H04B 10/08* (2006.01)
*H04B 10/50* (2013.01)
*H04B 10/564* (2013.01)

(52) U.S. Cl.
CPC ............ *H04B 10/505* (2013.01); *H04B 10/564* (2013.01)

(58) Field of Classification Search
None
See application file for complete search history.

(56) References Cited

U.S. PATENT DOCUMENTS

| 5,706,116 | A | * | 1/1998 | Sugata | 398/182 |
| 5,706,117 | A | * | 1/1998 | Imai et al. | 398/197 |
| 5,917,637 | A | * | 6/1999 | Ishikawa et al. | 398/197 |
| 6,359,720 | B1 | | 3/2002 | Yamada | |
| 6,873,801 | B1 | * | 3/2005 | Yamaki et al. | 398/198 |
| 7,801,450 | B2 | | 9/2010 | Abe et al. | |
| 2004/0028099 | A1 | * | 2/2004 | Hongo et al. | 372/38.02 |
| 2004/0208514 | A1 | * | 10/2004 | Zhang et al. | 398/25 |
| 2008/0107428 | A1 | * | 5/2008 | Abe et al. | 398/187 |
| 2009/0324255 | A1 | | 12/2009 | Nakamoto | |

FOREIGN PATENT DOCUMENTS

| JP | 10-27931 | 1/1998 |
| JP | 2000-221457 | 8/2000 |
| JP | 2003-163639 | 6/2003 |
| JP | 2004-61556 | 2/2004 |
| WO | 2006/048944 | 5/2006 |
| WO | 2008/126276 A1 | 10/2008 |

OTHER PUBLICATIONS

Japanese Office Action issued Feb. 3, 2015 in corresponding Japanese Patent Application No. 2011-215553.

* cited by examiner

*Primary Examiner* — Ken Vanderpuye
*Assistant Examiner* — David Lambert
(74) *Attorney, Agent, or Firm* — Staas & Halsey LLP

(57) ABSTRACT

An optical transmitter includes an EA modulator, a photocurrent detection circuit, a modulator drive circuit, and a CPU. The EA modulator converts an input signal into an optical signal and outputs the optical signal. The photocurrent detection circuit detects an optical absorption current (a photocurrent) in the EA modulator. The modulator drive circuit controls the EA modulator. The CPU calculates a voltage to be applied to the modulator drive circuit based on the optical absorption current detected by the photocurrent detection circuit.

4 Claims, 11 Drawing Sheets

FIG.9

| OPTICAL WAVELENGTH CHANNEL CH | WAVELENGTH CORRECTION COEFFICIENT $B_{CH}$ OF OPTICAL POWER | WAVELENGTH CORRECTION COEFFICIENT $C_{CH}$ OF PHOTOCURRENT |
|---|---|---|
| $CH_1$ | $B_{CH1}$ | $C_{CH1}$ |
| $CH_2$ | $B_{CH2}$ | $C_{CH2}$ |
| $CH_3$ | $B_{CH3}$ | $C_{CH3}$ |
| ⋮ | ⋮ | ⋮ |
| $CH_n$ | $B_{CHn}$ | $C_{CHn}$ |

| DETECTED TEMPERATURE VALUE T | TEMPERATURE CORRECTION COEFFICIENT $B_T$ OF OPTICAL POWER | TEMPERATURE CORRECTION COEFFICIENT $C_T$ OF PHOTOCURRENT |
|---|---|---|
| $T_0$ TO $T_1$ | $B_{T1}$ | $C_{T1}$ |
| $T_1$ TO $T_2$ | $B_{T2}$ | $C_{T2}$ |
| $T_2$ TO $T_3$ | $B_{T3}$ | $C_{T3}$ |
| ⋮ | ⋮ | ⋮ |
| $T_{n-1}$ TO $T_n$ | $B_{Tn}$ | $C_{Tn}$ |

481b

OPTICAL TRANSMITTER AND WAVEFORM COMPENSATION METHOD

CROSS-REFERENCE TO RELATED APPLICATION

This application is based upon and claims the benefit of priority of the prior Japanese Patent Application No. 2011-215553, filed on Sep. 29, 2011, the entire contents of which are incorporated herein by reference.

FIELD

The embodiments discussed herein are directed to an optical transmitter and a waveform compensation method.

BACKGROUND

An optical transmitter modulates an input signal having a predetermined waveform with the use of an optical modulator, and outputs the modulated signal as optical power having a predetermined waveform. An optical output waveform depends largely on a waveform of an input signal, and therefore, it is difficult for the optical transmitter to be sufficiently tolerant to variation in the amplitude of an input signal. Consequently, conventionally, the optical transmitter generates a signal independent of amplitude variation with the use of an interface circuit or the like, and then causes the optical modulator to compensate a waveform which has been degraded through a modulator drive circuit. Thus the optical transmitter can obtain a uniform optical output waveform regardless of the amplitude of an input signal. Such a configuration as described above is often adopted especially for an optical transmitter mounted with an electro absorption (EA) modulator aimed at long-distance transmission.

Patent document 1: Japanese Laid-open Patent Publication No. 2003-163639
Patent document 2: International Publication Pamphlet No. WO 2006/048944
Patent document 3: Japanese Laid-open Patent Publication No. 10-27931
Patent document 4: Japanese Laid-open Patent Publication No. 2000-221457

However, when the above-described interface circuit is mounted on the optical transmitter, packaging efficiency is reduced, and it becomes difficult to achieve downsizing by high-density packaging and low power consumption. Therefore, an optical transmitter without an interface circuit is desired; however, such an optical transmitter does not generate a signal independent of variation in the amplitude, and variation in the amplitude directly appears as variation in an optical output waveform. As a result, the tolerance to amplitude variation is significantly reduced. Especially, when the amplitude of an input signal is small, a shift amount of a cross-point in a waveform of a signal input to an optical modulator is not consistent with extinction characteristics of the optical modulator, and the cross-point sometimes does not fall within an allowable range (on or around 50%) in the optical output waveform. This is a factor that inhibits a stable coding error characteristic before and after long-distance transmission.

SUMMARY

According to an aspect of the embodiments, an optical transmitter includes: an optical modulator that converts an input signal into an optical signal and outputs the optical signal; a current detection circuit that detects an optical absorption current in the optical modulator; a drive circuit that drives the optical modulator; and a processor that calculates a voltage to be applied to the drive circuit based on the optical absorption current detected by the current detection circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 9 is a diagram illustrating an example of storage of data in a wavelength-based $V_{dut}$ value correction table according to the third embodiment;
FIG. 11 is a diagram illustrating an example of storage of data in a temperature-based $V_{dut}$ value correction table according to the fourth embodiment.

DESCRIPTION OF EMBODIMENTS

Preferred embodiments will be explained with reference to accompanying drawings.

Incidentally, the optical transmitter and waveform compensation method according to the present invention are not limited to the embodiments below.

[a] First Embodiment

Figure 1:
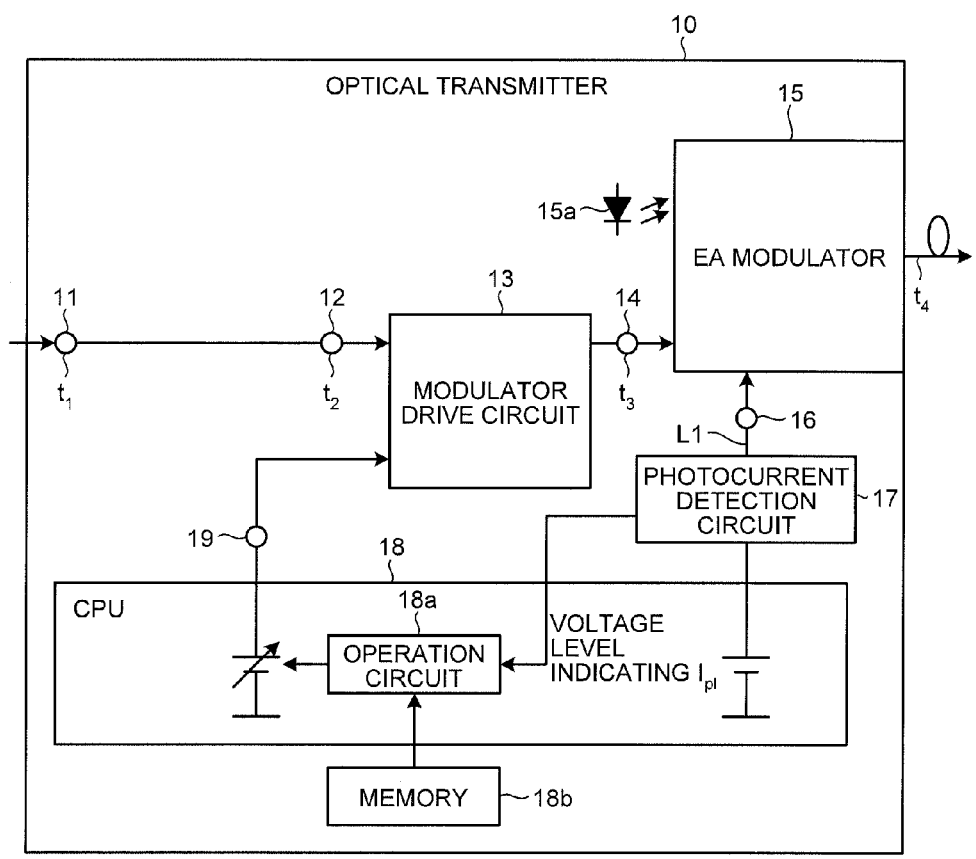
FIG. 1 is a diagram illustrating a configuration of an optical transmitter according to a first embodiment.

First, a configuration of an optical transmitter according to an embodiment of the present invention is explained. FIG. 1 is a diagram illustrating a configuration of an optical transmitter 10 according to a first embodiment. As illustrated in FIG. 1, the optical transmitter 10 includes input terminals 11 and 12, a modulator drive circuit 13, an input terminal 14, an electro absorption (EA) modulator 15, an input terminal 16, a photocurrent detection circuit 17, a central processing unit (CPU) 18, and an input terminal 19. These components are connected so as to input/output a signal or data unidirectionally or bidirectionally.

The input terminal 11 receives a signal from the outside to the optical transmitter 10 and outputs the received signal to the input terminal 12. The input terminal 12 receives the signal output from the input terminal 11 and outputs the received signal to the modulator drive circuit 13. The modulator drive circuit 13 has drive control of the EA modulator 15 in accordance with an electrical signal received from the input terminal 12. The input terminal 14 receives a signal output from the modulator drive circuit 13 and outputs the received signal to the subsequent EA modulator 15. The EA modulator 15 is an electro absorption modulator that receives a direct-current light generated in a laser diode (LD) 15a, converts an electrical signal into an optical signal, and outputs the optical signal. The input terminal 16 receives an optical signal output from the photocurrent detection circuit 17 and outputs the received optical signal to the EA modulator 15.

The photocurrent detection circuit 17 detects an amount of current generated with absorption of light in the EA modulator 15 as a photocurrent value $I_{p1}$ from a supply line L1 of bias voltage applied to the preceding EA modulator 15. The photocurrent detection circuit 17 converts the detected photocurrent value $I_{p1}$ into a voltage level and outputs the voltage level. The CPU 18 has variable control of a cross-point control voltage to be output to the modulator drive circuit 13 based on a result of an operation performed by an operation circuit 18a so that the voltage level based on the photocurrent value $I_{p1}$ detected by the photocurrent detection circuit 17 is kept at a constant level. The input terminal 19 supplies a cross-point control voltage depending on a change in an optical absorption current detected by the photocurrent detection circuit 17 to the modulator drive circuit 13.

Subsequently, the operating principles of the optical transmitter 10 are explained. A bias voltage (an EA bias voltage) is applied to the EA modulator 15; at this time, an optical absorption current proportional to an amount of light absorption by the EA modulator 15 flows through the input terminal 16 on the voltage supply line L1. A current amount of this optical absorption current is proportional to an amount of light absorption by the EA modulator 15; therefore, when optical power of a light input from the LD 15a to the EA modulator 15 is constant, if optical output power is increased, a light absorption rate is decreased, and an amount of optical absorption current is also decreased. On the other hand, an amount of optical absorption current decreases with a rise of a cross-point of an optical output waveform. This rise of the cross-point causes variation in a duty ratio and degradation of the optical output waveform. Therefore, the optical transmitter 10 has feedback control of the cross-point and keeps an amount of optical absorption current constant, thereby obtaining an optical output waveform that is less likely to vary due to the amplitude of an input signal.

More specifically, the photocurrent detection circuit 17 detects an amount of optical absorption current, converts a result of the detection into a voltage level, and outputs the voltage level to the subsequent CPU 18. The CPU 18 calculates an optimum cross-point control voltage with reference to a value of an optical absorption current amount when a cross-point takes an optimum value which has been stored in a memory 18b in advance. Namely, the CPU 18 compares a photocurrent value $I_{p1}$, which is the converted voltage level, with a reference value $I_{p0}$ of a photocurrent (an optical absorption current amount) stored in the memory 18b, and calculates a difference between them. The CPU 18 calculates a value of a cross-point control voltage $V_{dut}$ when the difference $\Delta I_p (=I_{p1}-I_{p0})$ is zero. The cross-point control voltage $V_{dut}$ is applied to the modulator drive circuit 13 via the input terminal 19. Incidentally, the CPU 18 is used as an example of a processor; alternatively, for example, a general-purpose processor can be used.

Figure 2A:
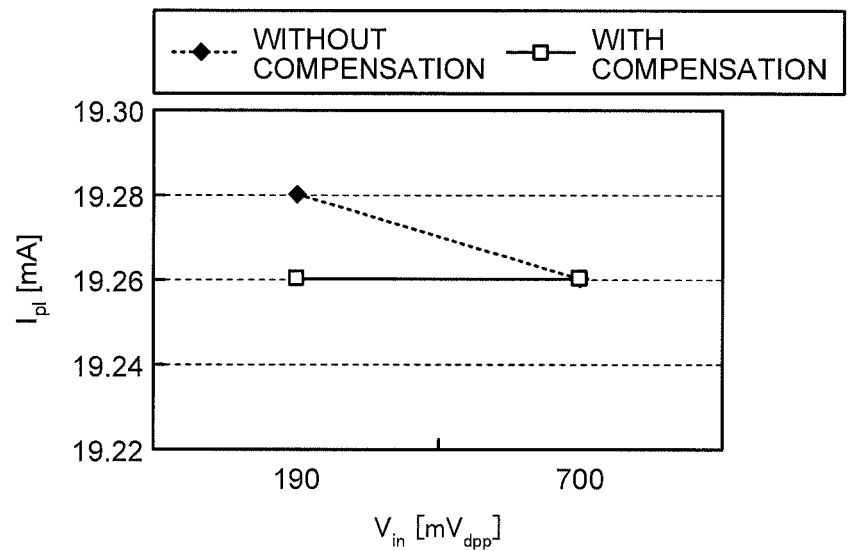
FIG. 2A is a diagram illustrating an example of an observation result of a relationship between an input voltage value and a photocurrent value.
Figure 2B:
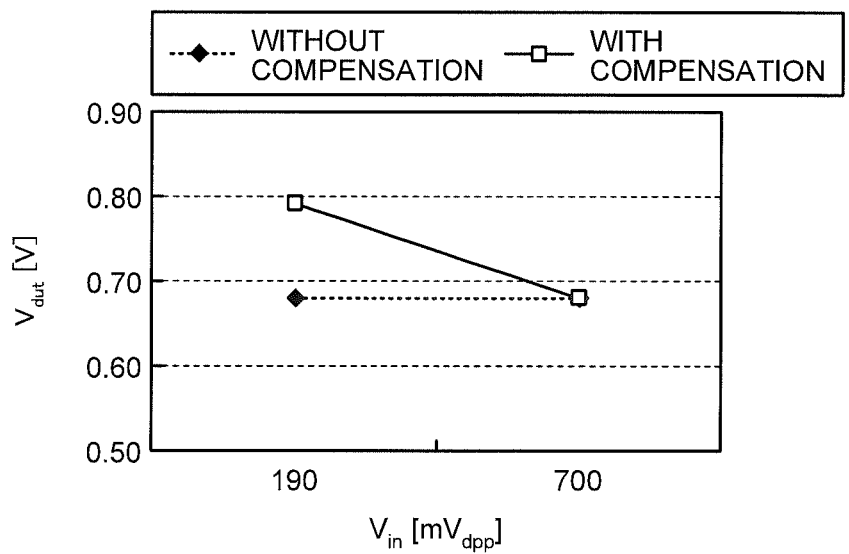
FIG. 2B is a diagram illustrating an example of an observation result of a relationship between an input voltage amplitude value and a cross-point control voltage value.

A cross-point control voltage $V_{dut}$ is controlled based on a photocurrent $I_{p1}$; a relationship between the cross-point control voltage $V_{dut}$ and the photocurrent $I_{p1}$ is explained. FIG. 2A is a diagram illustrating an example of an observation result of a relationship between an input voltage value and a photocurrent value; FIG. 2B is a diagram illustrating an example of an observation result of a relationship between an input voltage amplitude value and a cross-point control voltage value. A cross-point control voltage is controlled to be a value illustrated in FIGS. 2A and 2B based on a photocurrent value identified by the medium of an input voltage value. In FIG. 2A, the horizontal axis indicates an input voltage $V_{in}$ (unit: $mV_{dpp}$), and the vertical axis indicates a photocurrent value (unit: mA). As illustrated in FIG. 2A, regardless of whether the amplitude of an input signal is large or small, a photocurrent value $I_{p1}$ is kept at a constant value (19.26 mA) by waveform compensation; consequently, a cross-point control voltage value $V_{dut}$ takes a value which varies depending on the amplitude of an input signal as illustrated in FIG. 2B. Specifically, a cross-point control voltage value $V_{dut}$ is controlled to be 0.79 V at the time of small-amplitude input of $V_{in}=190$ $mV_{dpp}$, and controlled to be 0.68 V at the time of large-amplitude input of $V_{in}=700$ $mV_{dpp}$.

Namely, when the optical transmitter 10 does not make waveform compensation, in other words, when a cross-point control voltage value $V_{dut}$ is constantly kept at 0.68 V (see FIG. 2B), a photocurrent value $I_{p1}$ takes a value which varies depending on the amplitude of an input signal (19.28 mA and 19.26 mA) (see FIG. 2A). In this manner, a cross-point also varies with dependence on variation in the amplitude of an input signal. On the other hand, when the optical transmitter 10 makes waveform compensation, a cross-point control voltage value $V_{dut}$ varies so that a photocurrent value $I_{p1}$ is kept constant regardless of whether the amplitude of an input signal is large or small. By suppressing variation in a photocurrent value, variation in a cross-point is suppressed. As a result, a stable optical output waveform is maintained.

Figure 3:
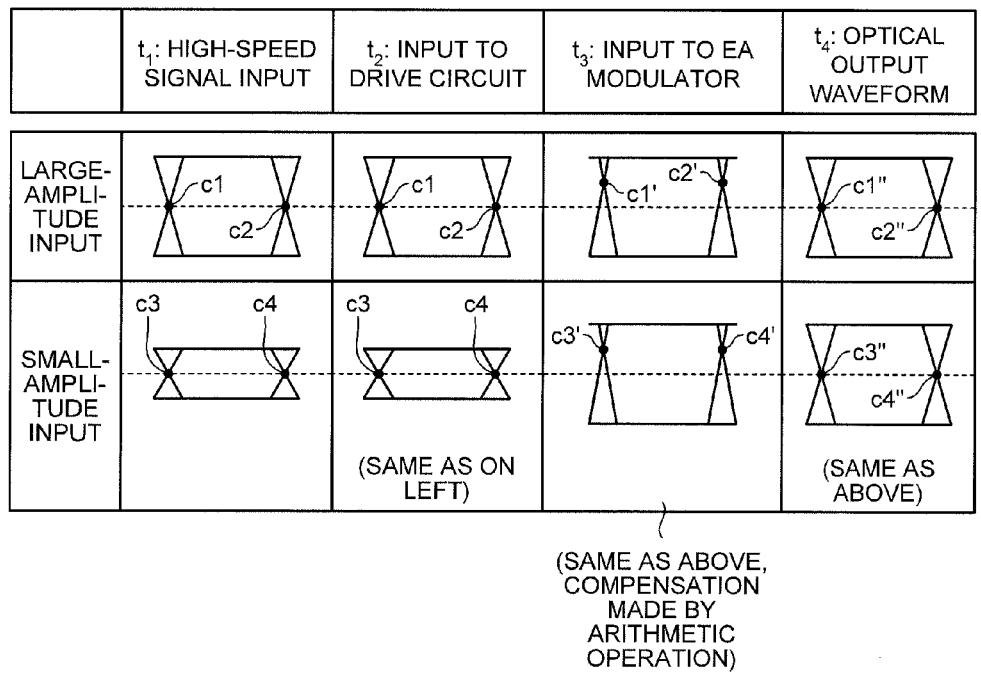
FIG. 3 is a diagram illustrating a signal waveform depending on the amplitude of an input signal.

FIG. 3 is a diagram illustrating signal waveforms at the time of large-amplitude input and at the time of small-amplitude input. In FIG. 3, the horizontal axis indicates a time t, and the vertical axis indicates a voltage level or power level of a signal. As illustrated in FIG. 3, at a time point $t_1$ (see FIG. 1), regardless of whether large-amplitude input or small-amplitude input, cross-points c1, c2 and cross-points c3, c4 are both approximately 50%. Furthermore, as the optical transmitter 10 does not include an interface circuit, also at a time point $t_2$ (see FIG. 1), a waveform at the time of small-amplitude input is not shaped (does not undergo waveform regeneration), and the same waveform as at the time point $t_1$ is maintained. After that, at a time point $t_3$ when a signal is input to the EA modulator 15 (see FIG. 1), cross-points c1', c2' and cross-points c3', c4' rise to around 75%. In an example illustrated in FIG. 3, a cross-point rises higher as the amplitude of an input optical signal is smaller, and accordingly, a value of average power rises, and an amount of optical absorption current (a photocurrent value) in the EA modulator 15 decreases. In the optical transmitter 10, a voltage applied to the modulator drive circuit 13 is feedback-controlled; therefore, values of the cross-points c3', c4' are adjusted to be the same value (about 75%) as the cross-points c1', c2'. Consequently, an optical output waveform at a time point $t_4$ (see FIG. 1) is independent of the amplitude of an input signal, and is maintained in a waveform in which cross-points c1", c2" and c3", c4" take a value of about 50%.

Figure 4A:
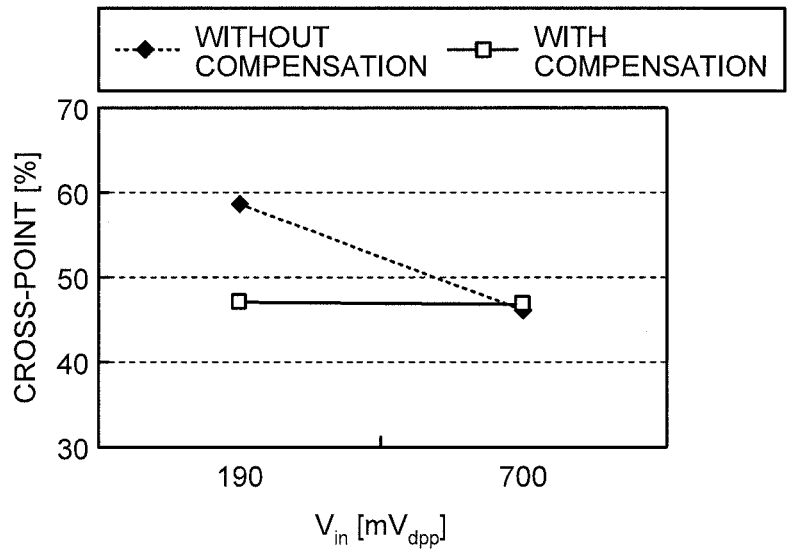
FIG. 4A is a diagram illustrating an observation result of a cross-point according to the first embodiment.
Figure 4B:
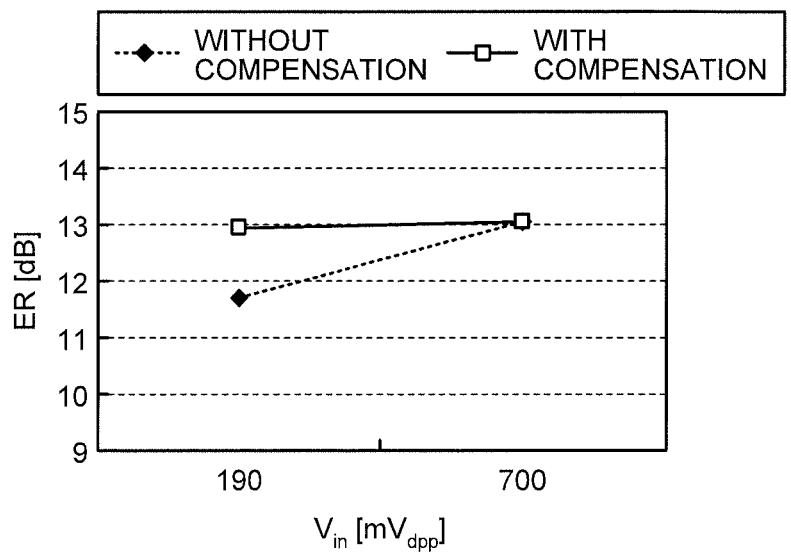
FIG. 4B is a diagram illustrating an observation result of an extinction ratio ER according to the first embodiment.

FIG. 4A is a diagram illustrating an observation result of a cross-point according to the first embodiment. In FIG. 4A, the horizontal axis indicates an input voltage $V_{in}$ (unit: $mV_{dpp}$), and the vertical axis indicates a cross-point (unit: %). As illustrated in FIG. 4A, at the time of large-amplitude input of $V_{in}=700$ $mV_{dpp}$, a cross-point takes a value of about 50% regardless of whether with or without waveform compensation; at the time of small-amplitude input of $V_{in}=190$ $mV_{dpp}$, a value of a cross-point is improved from about 60% to about 50% by waveform compensation. The same effect can apply to an extinction ratio ER. FIG. 4B is a diagram illustrating an observation result of an extinction ratio ER according to the first embodiment. In FIG. 4B, the horizontal axis indicates an input voltage $V_{in}$ (unit: $mV_{dpp}$), and the vertical axis indicates an ER value (unit: dB). As illustrated in FIG. 4B, at the time of large-amplitude input of $V_{in}=700$ $mV_{dpp}$, an ER takes a value of about 13 dB regardless of whether with or without waveform compensation; at the time of small-amplitude input of $V_{in}=190$ $mV_{dpp}$, an ER value is improved from about 12 dB to about 13 dB by waveform compensation. Namely, in the optical transmitter 10, a voltage to be applied to the modulator drive circuit 13 is feedback-controlled based on an amount of optical absorption current in the EA modulator 15, thereby variation in a cross-point or extinction ratio due to the amplitude of an input signal is suppressed. As a result, an optical signal with a stable waveform is output, and variation in optical receive power is suppressed.

As explained above, the optical transmitter 10 includes the EA modulator 15, the photocurrent detection circuit 17, the modulator drive circuit 13, and the CPU 18. The EA modulator 15 converts an input signal into an optical signal, and outputs the optical signal. The photocurrent detection circuit 17 detects an optical absorption current in the EA modulator 15. The CPU 18 calculates a voltage to be applied to the modulator drive circuit 13 based on the optical absorption current detected by the photocurrent detection circuit 17. The modulator drive circuit 13 controls the EA modulator 15 using the applied voltage calculated by the CPU 18. Thus the optical transmitter 10 automatically compensates an optical output waveform in accordance with variation in an amount of optical absorption current. Therefore, regardless of variation in the amplitude of an input signal, an optical output waveform with stabled cross-points can be obtained. In other words, the optical transmitter 10 has a sufficient amplitude tolerance to variation in an input signal. Consequently, the optical transmitter 10 can express stable coding error characteristics before and after long-distance transmission. In addition, the optical transmitter 10 can tolerate relatively great variation in the line length from an ASIC/SerDes (Application Specific Integrated Circuit/Serializer Deserializer), so it is possible to increase the number of on-board modules per unit.

Furthermore, the optical transmitter 10 does not include an interface circuit, so it is possible to achieve downsizing of the device and low power consumption. Moreover, the optical transmitter 10 utilizes the EA bias voltage supply line L1 which is a signal line essential for control of the EA modulator 15, so the optical transmitter 10 does not have to branch or couple an optical signal in generation and output of the optical signal. Consequently, the optical transmitter 10 is not subject to the influence of, for example, a branching ratio of a photocoupler or a loss caused by signal branch and variation in the loss. Therefore, it is not necessary to add a new component or supply electric power for eliminating the influence. As a result, it is possible to reduce a footprint and power consumption.

[b] Second Embodiment

Figure 5:
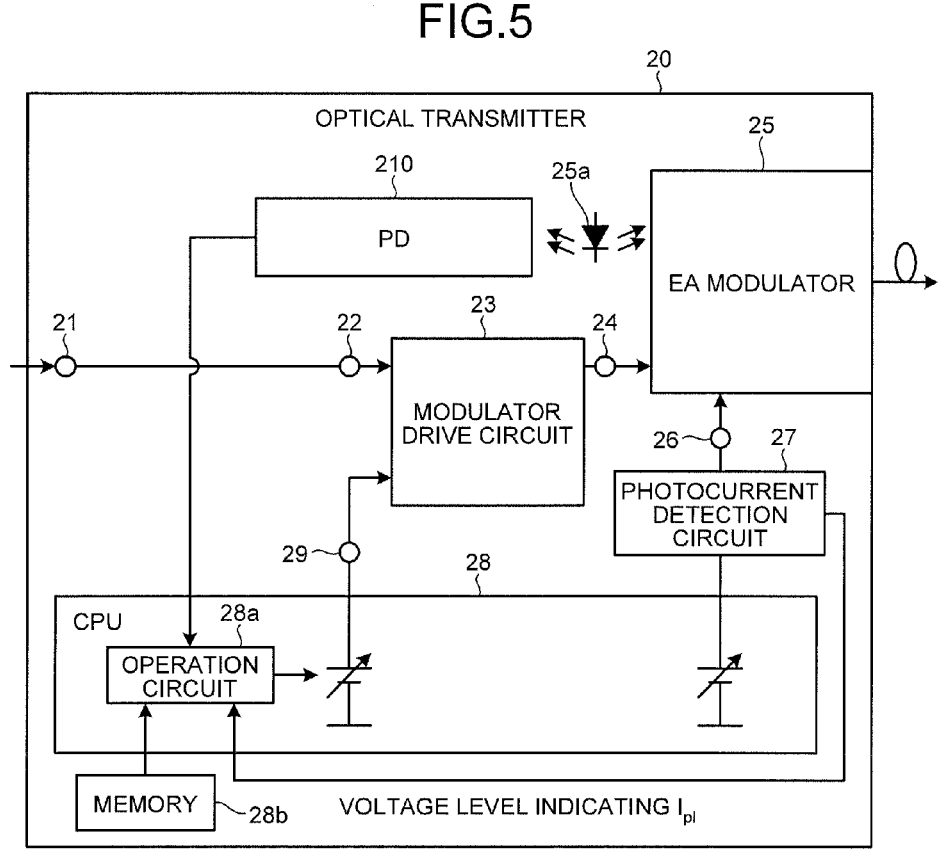
FIG. 5 is a diagram illustrating a configuration of an optical transmitter according to a second embodiment.
Figure 6:
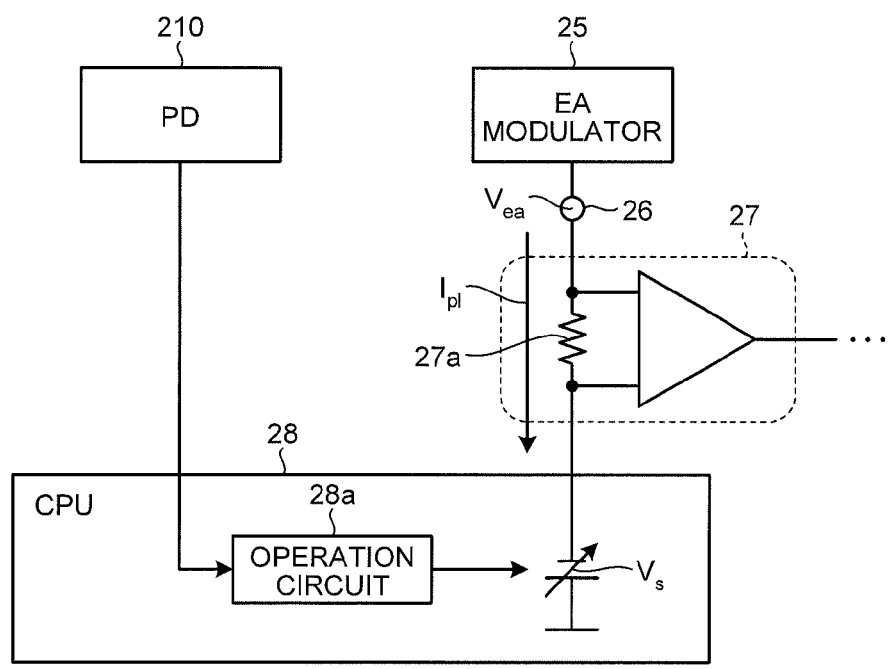
FIG. 6 is a diagram illustrating a configuration of a photocurrent detection circuit according to the second embodiment.
Figure 7A:
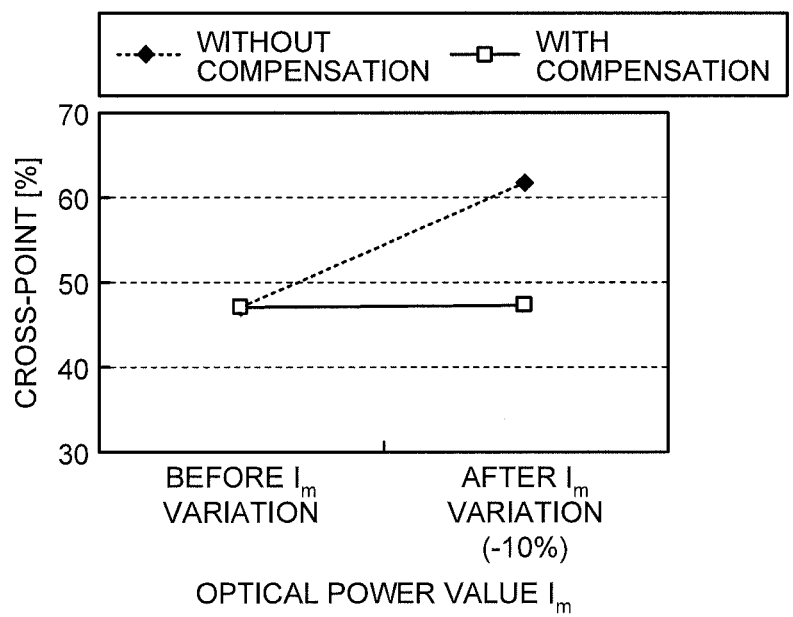
FIG. 7A is a diagram illustrating an observation result of a cross-point according to the second embodiment.
Figure 7B:
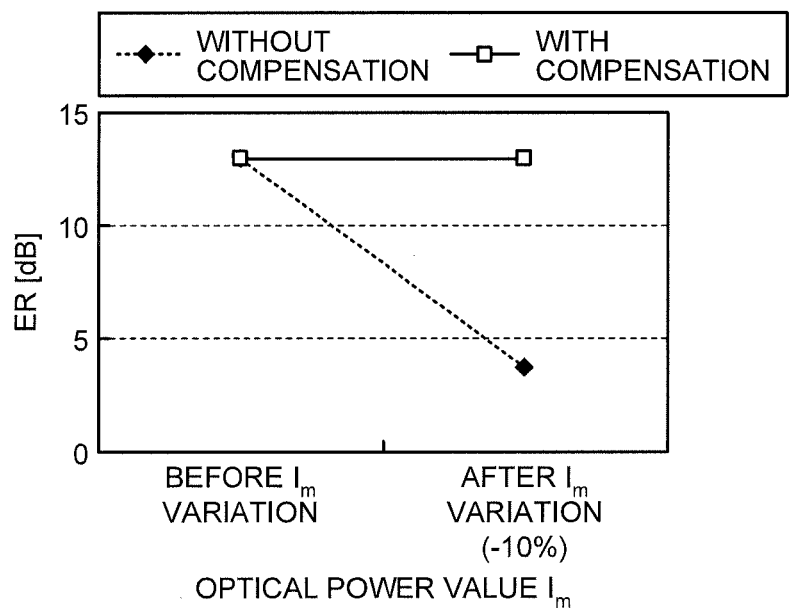
FIG. 7B is a diagram illustrating an observation result of an extinction ratio ER according to the second embodiment.

Subsequently, a second embodiment is explained. FIG. 5 is a diagram illustrating a configuration of an optical transmitter 20 according to the second embodiment. As illustrated in FIG. 5, the optical transmitter 20 has about the same configuration as the optical transmitter 10 illustrated in FIG. 1 except that the optical transmitter 20 further includes a photo diode (PD) 210. Therefore, in the second embodiment, components in common with the first embodiment are denoted by reference numerals of which the trailing number is the same as that is in the first embodiment, and detailed description of the components is omitted. What the second embodiment differs from the first embodiment is that when optical power supplied from an LD 25a is not constant, the optical transmitter 20 has control of a cross-point control voltage $V_{dut}$, while taking into account the variation in optical power. Namely, in the first embodiment, there is described the case where optical power supplied from the LD 15a is constant; on the other hand, in the second embodiment, there is assumed a case where optical power from the LD 25a is increased or decreased, resulting in the occurrence of variation in a photocurrent. In this case, the optical transmitter 20 has difficulty in making a distinction between the variation in a photocurrent and variation in a photocurrent associated with variation in a cross-point, and may vary a cross-point control voltage $V_{dut}$ in response to the former variation in a photocurrent to which the optical transmitter 20 does not normally have to respond. With reference to FIGS. 6, 7A, and 7B, the operation of this optical transmitter 20 in the second embodiment is explained below with a focus on differences with the first embodiment.

The PD 210 serves as an LD back power detector that detects optical power (back power) of the LD 25a. The PD 210 outputs a value of the detected optical power to an operation circuit 28a of a CPU 28. The CPU 28 corrects a result of calculation made by the operation circuit 28a depending on a decrease or increase in optical power of the LD 25a, thereby maintaining a cross-point control voltage $V_{dut}$ causing a cross-point to fall within a predetermined range regardless of variation in optical power. Specifically, an initial value $I_{m0}$ of the optical power has been stored in a memory 28b in advance, and the CPU 28 calculates a ratio A ($=I_{m1}/I_{m0}$) of an optical power value $I_{m1}$ input from the PD 210 to the initial value $I_{m0}$. Furthermore, the CPU 28 corrects a value of $\Delta I_p$ using an equation of $\Delta I_p = I_{p1} - (I_{p0} \times A)$. Then, the CPU 28 calculates a value of cross-point control voltage $V_{dut}$ causing $\Delta I_p$ to be zero. The cross-point control voltage $V_{dut}$ is applied to a modulator drive circuit 23 via an input terminal 29.

FIG. 6 is a diagram illustrating a configuration of a photocurrent detection circuit 27 according to the second embodiment. As illustrated in FIG. 6, the photocurrent detection circuit 27 includes a monitor resistance 27a with a resistance value $R_{mon}$. As described above, when optical power of the LD 25a varies, a photocurrent also varies; at this time, in the photocurrent detection circuit 27, voltage drop in the monitor resistance 27a may vary due to the variation in the photocurrent. In this case, if a value of EA bias control voltage $V_s$ is constant, a value of EA bias voltage $V_{ea}$ applied to an EA modulator 25 varies, and there is fear that an optical output waveform may be degraded and also a photocurrent may vary. Therefore, in the optical transmitter 20 according to the second embodiment, it is preferable that the CPU 28 corrects a value of EA bias control voltage $V_s$ using the ratio A and the following equation (1). A value of EA bias voltage $V_{ea}$ is kept at a constant value by this correction. As a result, degradation of the optical output waveform is suppressed.

$$V_{s1}=V_{s0}+R_{mon}\times I_{p0}\times(1-A) \quad (1)$$

Incidentally, in the above equation (1), $V_{s0}$ denotes a value (an initial value) of EA bias control voltage before optical power of the LD 25a varies; $V_{s1}$ denotes a value of EA bias control voltage after the variation in optical power of the LD 25a. Therefore, a value of EA bias control voltage, which has been $V_{s0}$ before the variation in optical power, is corrected to $V_s=V_{s1}$ with the variation.

FIG. 7A is a diagram illustrating an observation result of a cross-point according to the second embodiment. In FIG. 7A, the horizontal axis indicates an optical power value $I_m$, and the vertical axis indicates a cross-point (unit: %). As illustrated in FIG. 7A, when there is no variation in optical power value $I_m$, a cross-point takes a value of about 50% regardless of whether with or without waveform compensation; when the optical power value $I_m$ varies by −10%, a value of the cross-point is improved from about 60% to about 50% by waveform compensation. Such an effect can apply similarly to an extinction ratio ER. FIG. 7B is a diagram illustrating an observation result of an extinction ratio ER according to the second embodiment. In FIG. 7B, the horizontal axis indicates an optical power value $I_m$, and the vertical axis indicates an ER value (unit: dB). As illustrated in FIG. 7B, when there is no variation in optical power value $I_m$, an ER takes a value of about 13 dB regardless of whether with or without waveform compensation; when the optical power value $I_m$ varies by −10%, an ER value is improved from about 4 dB to about 13 dB by waveform compensation. Namely, in the same manner as the optical transmitter 10, also in the optical transmitter 20, a voltage applied to the modulator drive circuit 23 is feedback-controlled based on an amount of optical absorption current in the EA modulator 25, thereby variations in cross-point and extinction ratio due to the amplitude of an input signal are suppressed. As a result, an optical signal with stable waveform is output, and variation in optical receive power is suppressed.

As explained above, the optical transmitter 20 further includes the PD 210. The PD 210 detects optical power of light input to the EA modulator 25. The CPU 28 calculates a voltage to be applied to the modulator drive circuit 23 based on an optical absorption current detected by the photocurrent detection circuit 27 and the optical power detected by the PD 210. Consequently, the optical transmitter 20 does not recognize variation in optical power erroneously as variation in a cross-point. Therefore, the optical transmitter 20 can maintain a predetermined optical output waveform in which a cross-point is located on or around 50% without any influence of variation in optical power (back power) from the LD 25a. As a result, the reliability of the optical transmitter 20 is improved.

[c] Third Embodiment

Figure 8:
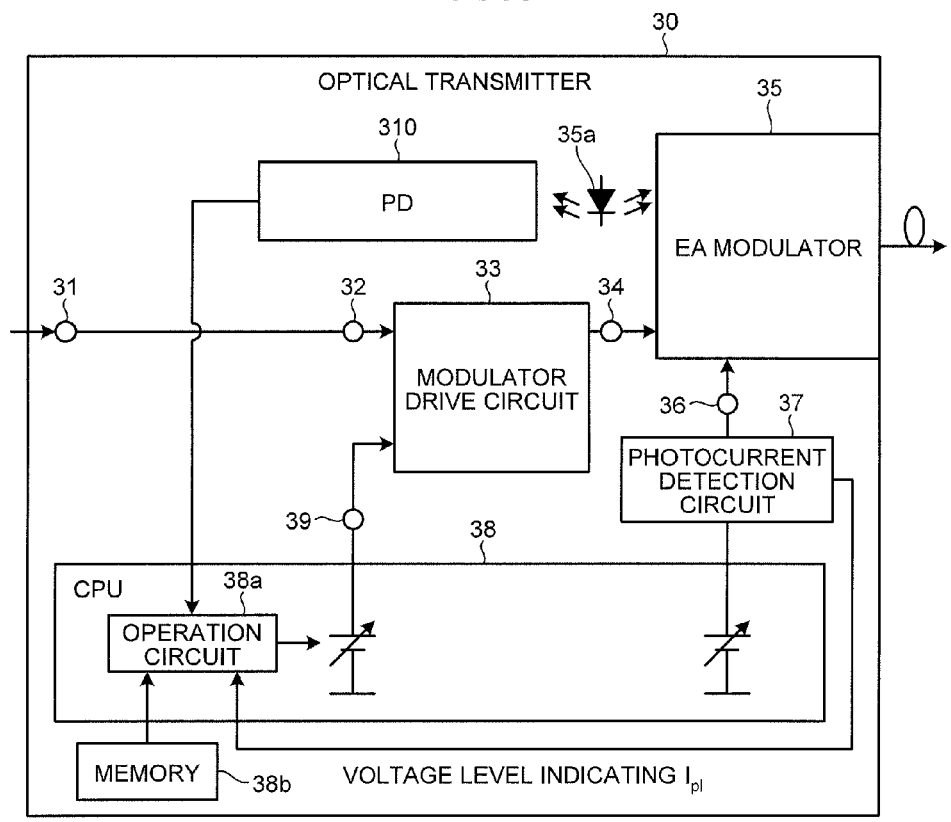
FIG. 8 is a diagram illustrating a configuration of an optical transmitter according to a third embodiment.

Subsequently, a third embodiment is explained. FIG. 8 is a diagram illustrating a configuration of an optical transmitter 30 according to the third embodiment. As illustrated in FIG. 8, the optical transmitter 30 has about the same configuration as the optical transmitter 20 illustrated in FIG. 5 except that the optical transmitter 30 uses a tunable laser diode (LD) 35a instead of the LD 25a. Therefore, in the third embodiment, components in common with the second embodiment are denoted by reference numerals of which the trailing number is the same as that is in the second embodiment, and detailed description of the components is omitted. What the third embodiment differs from the second embodiment is that when light supplied from the tunable LD 35a has a plurality of different wavelengths, the optical transmitter 30 has control of a cross-point control voltage $V_{dut}$, while taking into account the variation in wavelength. Namely, in the second embodiment, there is described a case where the wavelength of a light supplied from the LD 25a is constant (a fixed wavelength); on the other hand, in the third embodiment, there is assumed a case where the wavelength of a light emitted from the tunable LD 35a varies. In this case, a coupling loss between the tunable LD 35a and a PD 310 is increased or decreased, so optical power (back power) of the tunable LD 35a also varies. Furthermore, with the variation in light wavelength, extinction (optical absorption) characteristics of an EA modulator 35 vary due to the difference in light wavelength. This variation in extinction characteristics causes variation in a photocurrent, so the use of the tunable LD 35a causes an error in control of a cross-point by the optical transmitter 30, and this may vary the cross-point control voltage $V_{dut}$. With reference to FIG. 9, the operation of this optical transmitter 30 in the third embodiment is explained below with a focus on differences with the second embodiment.

The tunable LD 35a is a full-band tunable LD capable of outputting a plurality of different wavelengths of lights in wide wavelength bands formed by a wavelength division multiplex (WDM) system with one module. In a memory 38b, a wavelength correction coefficient $B_{CH}$ of optical power (LD back power) from the tunable LD 35a and a wavelength correction coefficient $C_{CH}$ of a photocurrent are stored with respect to each light wavelength channel CH. A CPU 38 corrects a result of calculation made by an operation circuit 38a depending on variation in wavelength of light from the tunable LD 35a, thereby maintaining a cross-point control voltage $V_{dut}$ causing a cross-point to fall within a predetermined range regardless of variation in light wavelength.

FIG. 9 is a diagram illustrating an example of storage of data in a wavelength-based $V_{dut}$ value correction table 381b according to the third embodiment. As illustrated in FIG. 9, the wavelength-based $V_{dut}$ value correction table 381b has a WDM wavelength channel storage area, an optical-power wavelength correction coefficient storage area, and a photocurrent wavelength correction coefficient storage area. In these storage areas, a wavelength correction coefficient $B_{CH}$ of optical power from the tunable LD 35a and a wavelength correction coefficient $C_{CH}$ of a photocurrent are stored in a manner to be associated with a light wavelength channel CH. Light wavelength channels CH are stored in the wavelength channel storage area at intervals of a wavelength of 400 pm or 800 pm in accordance with ITU-T (G.694.1). Data stored in the wavelength-based $V_{dut}$ value correction table 381b can be arbitrarily updated depending on a change in a correspondence relationship between a wavelength channel and a light wavelength.

The CPU 38 calculates respective values of $I_{m0}'=I_{m0}\times B_{CHn}$ and $I_{p0}'=I_{p0}\times C_{CHn}$ based on wavelength correction coefficients $B_{CHn}$, $C_{CHn}$ corresponding to $CH_n$ (n is a natural number) with reference to the wavelength-based $V_{dut}$ value correction table 381b. Furthermore, the CPU 38 corrects a value of $\Delta I_p$ using an equation of $\Delta I_p=I_{m0}'-(I_{p0}'\times A)$. Then, the CPU 38 calculates a value of cross-point control voltage $V_{dut}$ causing $\Delta I_p$ to be zero. The cross-point control voltage $V_{dut}$ is applied to a modulator drive circuit 33 via an input terminal 39.

As explained above, the optical transmitter 30 further includes the tunable LD 35a that generates a different wavelength of light and outputs the generated light to the EA modulator 35. The CPU 38 calculates a voltage to be applied to the modulator drive circuit 33 based on an optical absorption current detected by a photocurrent detection circuit 37 and the wavelength of light. Consequently, the waveform compensation technique using the above-described operation can also support an optical transmitter mounted with an element that generates a different wavelength of light. Therefore, the optical transmitter 30 can output a light with a waveform in which a cross-point is located on or around 50% without any influence of variation in wavelength of light emitted from the tunable LD 35a (LD wavelength). As a result, the reliability of the optical transmitter 30 is improved.

[d] Fourth Embodiment

Figure 10:
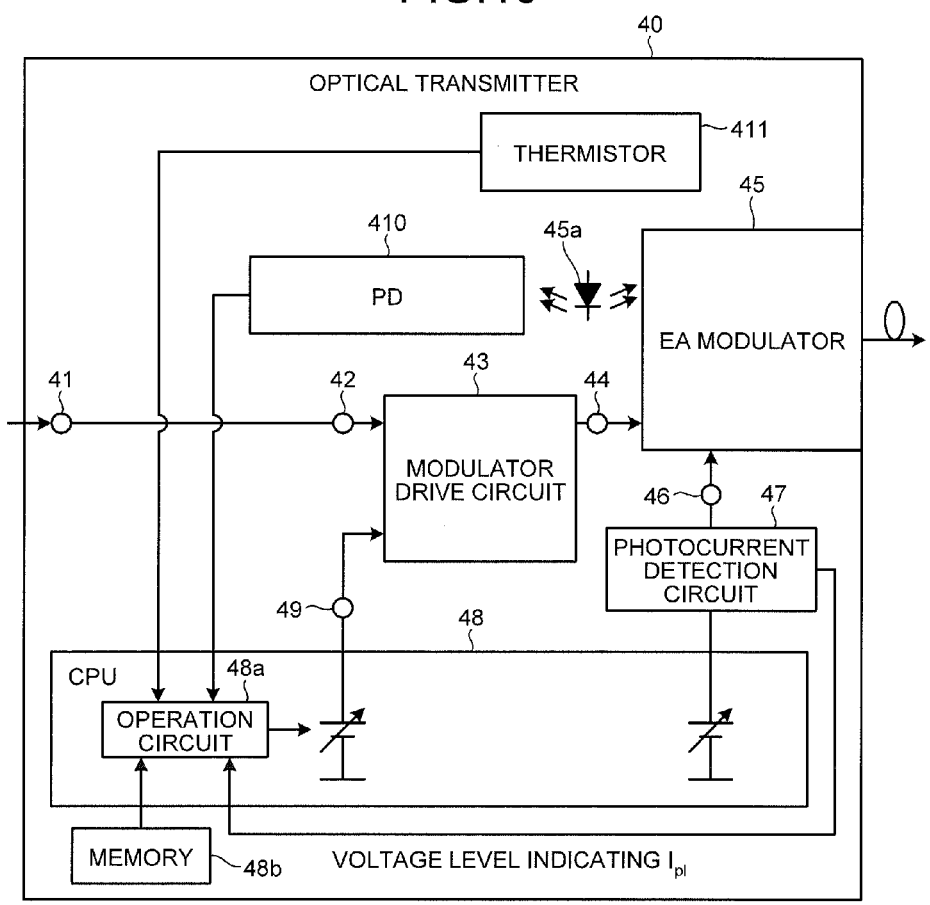
FIG. 10 is a diagram illustrating a configuration of an optical transmitter according to a fourth embodiment.

Subsequently, a fourth embodiment is explained. FIG. 10 is a diagram illustrating a configuration of an optical transmitter 40 according to the fourth embodiment. As illustrated in FIG. 10, the optical transmitter 40 has about the same configuration as the optical transmitter 20 illustrated in FIG. 5 except that the optical transmitter 40 further includes a thermistor 411. Therefore, in the fourth embodiment, components in common with the second embodiment are denoted by reference numerals of which the trailing number is the same as that is in the second embodiment, and detailed description of the components is omitted. What the fourth embodiment differs from the second embodiment is that when temperature control on an EA modulator 45 and an LD 45a is not performed, the optical transmitter 40 has control of a cross-point control voltage $V_{dut}$, while taking into account variation in ambient temperature. In the second embodiment, there is described a case where the ambient temperature is stable, i.e., it is controlled so that the temperature is kept constant by a Peltier element or the like. However, in recent years, some optical transmitters are configured not to have the above-described temperature control to reduce power consumption in conformity with the request of power saving. Furthermore, a wavelength of light has the property of shortening as the absolute temperature rises. So, in the fourth embodiment, there is assumed a case where a wavelength of light emitted from the LD 45a varies unexpectedly with a change in temperature.

Also in the above case, the same phenomenon as in the third embodiment arises. Namely, a coupling loss between the LD 45a and a PD 410 is increased or decreased, so optical power (back power) of the LD 45a also varies. Furthermore, with the variation in light wavelength, extinction (optical absorption) characteristics of the EA modulator 45 vary due to the difference in light wavelength. This variation in extinction characteristics causes variation in a photocurrent, so the use of the LD 45a causes an error in control of a cross-point by the optical transmitter 40, and as a result, the cross-point control voltage $V_{dut}$ may vary. With reference to FIG. 11, the operation of this optical transmitter 40 in the fourth embodiment is explained below with a focus on differences with the second embodiment.

As the thermistor 411 is a well-known commonly-used temperature measurement circuit, detailed description of the thermistor 411 is omitted. The thermistor 411 detects the absolute temperature near the EA modulator 45 and the LD 45a using a change in electric resistance due to a change in temperature (predetermined temperature resistance characteristics). In a memory 48b, a temperature correction coefficient $B_T$ of optical power (LD back power) from the LD 45a and a temperature correction coefficient $C_T$ of a photocurrent are stored with respect to each detected temperature value T detected by the thermistor 411. A CPU 48 corrects a result of calculation made by an operation circuit 48a depending on variation in light wavelength with a change in temperature, thereby maintaining a cross-point control voltage $V_{dut}$ causing a cross-point to fall within a predetermined range regardless of the change in temperature.

FIG. 11 is a diagram illustrating an example of storage of data in a temperature-based $V_{dut}$ value correction table 481b according to the fourth embodiment. As illustrated in FIG. 11, the temperature-based $V_{dut}$ value correction table 481b has a detected temperature value storage area, an optical-power temperature correction coefficient storage area, and a photocurrent temperature correction coefficient storage area. In these storage areas, a temperature correction coefficient $B_T$ of optical power from the LD 45a and a temperature correction coefficient $C_T$ of a photocurrent are stored in a manner to be associated with a detected temperature value T detected by the thermistor 411. The predetermined hierarchy is set in the detected temperature value T; for example, when a detected temperature value T takes a value in a range of "$T_1$ to $T_2$", the CPU 48 reads out "$B_{T2}$" as a temperature correction coefficient of optical power and reads out "$C_{T2}$" as a temperature correction coefficient of a photocurrent. Furthermore, when a detected temperature value T is in a range of "$T_{n-1}$ to $T_n$", the CPU 48 reads out "$B_{Tn}$" as a temperature correction coefficient of optical power and reads out "$C_{Tn}$" as a temperature correction coefficient of a photocurrent. Incidentally, data stored in the temperature-based $V_{dut}$ value correction table 481b can be arbitrarily updated depending on a change in installation environment of the optical transmitter 40 or the presence or absence of temperature control by the Peltier element or the like.

The CPU 48 calculates respective values of $I_{m0}"=I_{m0} \times B_{Tn}$ and $I_{p0}"=I_{p0} \times C_{Tn}$ based on temperature correction coefficients $B_{Tn}$, $C_{Tn}$ corresponding to $T_n$ (n is a natural number) with reference to the temperature-based $V_{dut}$ value correction table 481b. Furthermore, the CPU 48 corrects a value of $\Delta I_p$ using an equation of $\Delta I_p = I_{m0}" - (I_{p0}" \times A)$. Then, the CPU 48 calculates a value of cross-point control voltage $V_{dut}$ causing $\Delta I_p$ to be zero. The cross-point control voltage $V_{dut}$ is applied to a modulator drive circuit 43 via an input terminal 49.

As explained above, the optical transmitter 40 further includes the thermistor 411 that detects a temperature inside the optical transmitter 40. The CPU 48 calculates a voltage to be applied to the modulator drive circuit 43 based on an optical absorption current detected by a photocurrent detection circuit 47 and the temperature detected by the thermistor 411. Consequently, the optical transmitter 40 can respond also to a change in temperature inside the device. Namely, the optical transmitter 40 can output a light with a waveform in which a cross-point is located on or around 50% without any influence of variation in light wavelength (LD wavelength) with a change in temperature.

In the fourth embodiment, the optical transmitter 40 absorbs variation in a photocurrent due to a change in temperature, so the thermistor 411 is installed in the device; it is preferable to install the thermistor 411 near the LD 45a in the optical transmitter 40 from the perspective of making waveform compensation with a high degree of accuracy. More preferably, it's better to install the thermistor 411 between the EA modulator 45 and the LD 45a. When the installation point of the thermistor 411 is between the EA modulator 45 and the LD 45a, the thermistor 411 can accurately detect a temperature affecting, especially, the light wavelength. Therefore, the optical transmitter 40 makes waveform compensation based on the temperature, thereby the influence of variation in light wavelength with a change in temperature can be efficiently eliminated. As a result, the reliability of waveform compensation made by the optical transmitter 40 is improved.

Incidentally, in the above embodiments, as external factors that causes variation in a photocurrent and degradation of an output waveform, variation in the amplitude of an input signal, variation in optical power output from the LD, variation in wavelength of light output from the LD, and variation in ambient temperature are assumed. However, the above factors are not limited to these, and, for example, can be the wavelength of an input signal, variation in the amplitude of an optical signal, or a combination of any of these.

Furthermore, in the above embodiments, as for the relationship between a cross-point control voltage value $V_{dut}$ and a photocurrent value $I_{p1}$, when the optical transmitter increases a cross-point control voltage value $V_{dut}$, a photocurrent value $I_{p1}$ also increases with the increase in $V_{dut}$ (see FIGS. 2A and 2B). However, the $V_{dut}$–$I_{p1}$ characteristics differ by circuit configuration of the photocurrent detection circuit or the modulator drive circuit, and the above correlative relationship does not always have to be established. For example, the optical transmitter can adopt a circuit configuration in which a photocurrent value $I_{p1}$ decreases with an increase in a cross-point control voltage value $V_{dut}$.

Moreover, in the above description, the different configurations and operations among the embodiments are explained. However, the optical transmitter according to each embodiment can further include a component unique to another embodiment. Furthermore, the combination of embodiments is not limited to a combination of two embodiments, and any other forms, such as a combination of three or more embodiments, can be taken. For example, in the above description, in the third embodiment, there is described the form in which the optical transmitter 20 according to the second embodiment adopts the tunable LD 35a; however, the third embodiment can be applied regardless of whether with or without the PD, and can be combined with the optical transmitter 10 according to the first embodiment. The same holds true for the fourth embodiment; the fourth embodiment can be combined with not only the second embodiment but also the first embodiment and the third embodiment. Furthermore, one optical transmitter can include all the components described in the first to fourth embodiments.

According to an aspect of an optical transmitter described in the present application, it is possible to maintain an output waveform regardless of variation in an external factor.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An optical transmitter comprising:
   an optical modulator that converts an input signal into an optical signal and outputs the optical signal;
   a current detection circuit that detects an optical absorption current in the optical modulator;
   a drive circuit that drives the optical modulator;
   a processor that calculates a voltage to be applied to the drive circuit on the basis of the optical absorption current detected by the current detection circuit; and
   an optical-power detection circuit that detects optical power of a light input to the optical modulator, wherein
   the processor calculates a voltage to be applied to the drive circuit on the basis of the optical absorption current and the optical power and feedback-controls a voltage applied to the drive circuit on the basis of an amount of optical absorption current in the optical modulator to suppress variations in cross-point and extinction ratio due to amplitude of the input signal, wherein
   the drive circuit controls the optical modulator using the applied voltage, which is the voltage to be applied to the drive circuit on the basis of the optical absorption current and the optical power, calculated by the processor to automatically compensate an optical output waveform which has been degraded through the drive circuit in accordance with variation in the amount of optical absorption current, wherein
   when the processor corrects a result of calculation made by an operation circuit depending on a decrease or increase in optical power of a laser diode (LD), the processor calculates a ratio A, which is a ratio of an optical power value $I_{m1}$ input from the optical-power detection circuit to an initial value $I_{m0}$, to correct a value of $\Delta I_p$ using an equation $$\Delta I_p = I_{p1} - I_{p0} \times A$$

wherein $I_{p1}$ is a photocurrent value, which is a converted voltage level, and
   $I_{p0}$ is a reference value of a photocurrent,
   and calculates a value of a cross-point control voltage $V_{dut}$ causing the $\Delta I_p$ to be zero.

2. The optical transmitter according to claim 1, further comprising a laser diode that generates a light of different wavelengths and outputs the generated light to the optical modulator, wherein
   the processor calculates a voltage to be applied to the drive circuit on the basis of the optical absorption current and the wavelength of the light.

3. The optical transmitter according to claim 1, further comprising a thermistor that detects a temperature inside the optical transmitter, wherein
   the processor calculates a voltage to be applied to the drive circuit on the basis of the optical absorption current and the detected temperature.

4. A waveform compensation method comprising:
   converting an input signal into an optical signal and outputting the optical signal;
   detecting an optical absorption current in an optical modulator;
   driving the optical modulator;
   calculating a voltage to be applied to a drive circuit on the basis of the optical absorption current detected by a current detection circuit; and
   detecting optical power of a light input to the optical modulator, wherein
   the calculating includes calculating a voltage to be applied to the drive circuit on the basis of the optical absorption current and the optical power and feedback-controlling a voltage applied to the drive circuit on the basis of an amount of optical absorption current in the optical modulator to suppress variations in cross-point and extinction ratio due to amplitude of the input signal, wherein
   the driving includes controlling the optical modulator using the applied voltage, which is the voltage to be applied to the drive circuit on the basis of the optical absorption current and the optical power, calculated by a processor to automatically compensate an optical output waveform which has been degraded through the drive circuit in accordance with variation in the amount of optical absorption current, wherein
when the processor corrects a result of calculation made by an operation circuit depending on a decrease or increase in optical power of a laser diode (LD), the processor calculates a ratio A, which is a ratio of an optical power value $I_{m1}$ input from the optical-power detection circuit to an initial value $I_{m0}$, to correct a value of $\Delta I_p$ using an equation $$\Delta I_p = I_{p1} - I_{p0} \times A$$

wherein $I_{p1}$ is a photocurrent value, which is a converted voltage level, and
$I_{p0}$ is a reference value of a photocurrent,
and calculates a value of a cross-point control voltage $V_{dut}$ causing the $\Delta I_p$ to be zero.

* * * * *